(12) United States Patent
Persson et al.

(10) Patent No.: US 9,333,479 B2
(45) Date of Patent: May 10, 2016

(54) DEVICE FOR PERFORMING A CHEMICAL TRANSFORMATION IN FLUIDIC MEDIA

(71) Applicants: Jonas Persson, Kåge (SE); Kjell Oberg, Umea (SE); Fredrik Almqvist, Umea (SE); Knut Irgum, Bullmark (SE)

(72) Inventors: Jonas Persson, Kåge (SE); Kjell Oberg, Umea (SE); Fredrik Almqvist, Umea (SE); Knut Irgum, Bullmark (SE)

(73) Assignee: NORDIC CHEMQUEST AB, Umea (SE)

( * ) Notice: Subject to any disclaimer, the term of this patent is extended or adjusted under 35 U.S.C. 154(b) by 0 days.

(21) Appl. No.: 14/327,153

(22) Filed: Jul. 9, 2014

(65) Prior Publication Data

US 2014/0322093 A1 Oct. 30, 2014

Related U.S. Application Data

(62) Division of application No. 13/886,442, filed on May 3, 2013, now Pat. No. 8,808,636, which is a division of application No. 12/931,829, filed on Feb. 11, 2011, now Pat. No. 8,460,615.

(60) Provisional application No. 61/337,915, filed on Feb. 12, 2010.

(51) Int. Cl.
  *B01J 8/28* (2006.01)
  *B01J 8/10* (2006.01)
  (Continued)

(52) U.S. Cl.
  CPC ................. *B01J 19/28* (2013.01); *B01D 15/02* (2013.01); *B01D 15/1892* (2013.01);
  (Continued)

(58) Field of Classification Search
  CPC ................. B01J 8/025; B01J 2208/028; B01J 2208/00814
  USPC ........... 422/209, 261, 236, 211, 129; 210/683
  See application file for complete search history.

(56) References Cited

U.S. PATENT DOCUMENTS

| 1,678,778 A | 7/1928 | Harter |
| 3,554,497 A | 1/1971 | Zipperer |

(Continued)

FOREIGN PATENT DOCUMENTS

| GB | 703344 A | 2/1954 |
| JP | 2005-046822 A | 2/2005 |

OTHER PUBLICATIONS

Baltussen, E. et al., Stil Bar Sorptive Extraction (SBSE), a Novel Extraction Technique for Aqueous Samples: Theory and Principles, J. Microcolumn Sep. 11(10) 737-747 (1999).

(Continued)

*Primary Examiner* — Lessanework Seifu
(74) *Attorney, Agent, or Firm* — Harness, Dickey & Pierce, P.L.C.

(57) ABSTRACT

A device is provided for performing chemical transformation in a fluid, with a flow distributor having at least one fluid medium inlet, at least one fluid medium outlet, and at least one confinement wherein the chemical transformation is performed; and a means for rotating, rocking, wagging, or oscillating the device. At least one confinement may be equipped with a provision for providing heat, cooling, sound, light or other types of radiation, such provision being contacted to an external source through an actuator shaft. The flow distributor may be provided with sectors connected with the centrally located fluid medium inlet and a designated peripheral fluid medium outlet. The means for rotating, rocking, wagging, or oscillating the device may be an element producing magnetic fields or a shaft mechanically connected to an external actuating device.

6 Claims, 12 Drawing Sheets

(51) Int. Cl.
*B01J 19/28* (2006.01)
*B01F 7/00* (2006.01)
*B01F 7/16* (2006.01)
*B01F 11/00* (2006.01)
*B01F 13/08* (2006.01)
*B01J 4/00* (2006.01)
*B01J 8/02* (2006.01)
*B01J 19/18* (2006.01)
*B01J 47/00* (2006.01)
*B01D 15/02* (2006.01)
*B01D 15/18* (2006.01)
*B01J 47/10* (2006.01)

(52) U.S. Cl.
CPC ............... *B01F 7/006* (2013.01); *B01F 7/007* (2013.01); *B01F 7/00033* (2013.01); *B01F 7/00041* (2013.01); *B01F 7/163* (2013.01); *B01F 7/1625* (2013.01); *B01F 7/1635* (2013.01); *B01F 11/0088* (2013.01); *B01F 13/0818* (2013.01); *B01J 4/007* (2013.01); *B01J 8/025* (2013.01); *B01J 8/10* (2013.01); *B01J 19/1843* (2013.01); *B01J 47/00* (2013.01); *B01J 47/10* (2013.01); *B01J 47/105* (2013.01); *B01J 2208/00433* (2013.01); *B01J 2208/00442* (2013.01); *B01J 2208/00814* (2013.01); *B01J 2208/028* (2013.01); *B01J 2219/00139* (2013.01); *B01J 2219/00141* (2013.01); *Y10T 137/0318* (2015.04)

(56) References Cited

U.S. PATENT DOCUMENTS

| | | | |
|---|---|---|---|
| 3,767,535 | A | 10/1973 | Havewala et al. |
| 4,683,062 | A | 7/1987 | Krovak et al. |
| 5,691,206 | A | 11/1997 | Pawliszyn |
| 6,815,216 | B2 | 11/2004 | Sandra et al. |
| 6,857,774 | B2 | 2/2005 | Kozyuk |
| 2007/0189115 | A1 | 8/2007 | Yaniv et al. |

OTHER PUBLICATIONS

Eisert R. et al., Automated In-Tube Solid-Phase Microextraction coupled to High-Performance Liquid Chromatography, Analytical Chemistry 69(16), 3140-3147(1997).

a) Empty Device b) Single Functionality Configuration c) Series Configuration d) Parallel Configuration

DEVICE FOR PERFORMING A CHEMICAL TRANSFORMATION IN FLUIDIC MEDIA

CROSS-REFERENCE TO RELATED APPLICATIONS

This application is a divisional under 35 U.S.C. §121 of U.S. application Ser. No. 13/886,442, filed May 3, 2013, which is a divisional under 35 U.S.C. 121 of U.S. application Ser. No. 12/931,829, filed Feb. 11, 2011, now U.S. Pat. No. 8,460,615, issued Jun. 11, 2013, which claims priority under 35 U.S.C. §119 from U.S. provisional application Ser. No. 61/337,915, filed Feb. 12, 2010.

FIELD OF THE INVENTION

The present invention relates to devices for performing biological or chemical transformation, or physical or chemical trapping, comprising of one or more confinements, wherein a desirable fluidic flow through the confinement(s) is created by rotating, rocking, wagging, or oscillating the device.

BACKGROUND OF THE INVENTION

Heterogeneous processes in chemistry and biotechnology encompassing a solid member (including, but not limited to, immobilized chemical reagent, catalyst, scavenger, reaction support, or trapping sorbent, or immobilized biological, materials such as cells or fragments thereof) contacting a fluidic medium carrying reactants or other agents, sample solutes, and/or products of the interactive processing of fluid-conveyed agent(s) with the solid member(s) are critically dependent on convective flow to accomplish the necessary mass transfer between the two phases. Such systems are therefore often operated in a continuous flow through mode, in which case a conventional packed column with a suitable design is often the preferred format for encapsulating the solid member that is to be transited or percolated by the reaction medium. Numerous processes are, however, unfit for continuous processing. This applies in particular to processes where sequential addition of agents and/or removal of by-products or desired products are necessary, or where the physical or chemical conditions must otherwise be altered during the course of processing with the solid member. In those cases a batch-wise processing mode is often preferred. Such batch-wise heterogeneous processing can either be done by suspending the solid member directly in the fluidic medium as particulate material under agitation, a process that will normally call for a filtration or sedimentation step to separate the phases after the process has been brought to an end. Alternatively, the fluidic medium can be circulated from the batch reactor through a packed reservoir containing the solid member by means of a specially designed flow system comprising pumps and/or valves or the like, in order to accomplish the convective mass transfer needed for the reactions to take place. Such reactors are often quite complicated and must regularly be built for the specific purpose.

The challenge of establishing efficient convective mass transfer between solid and fluidic phases has been addressed, e.g., by applying the solid member as a coating on the external surface of a rotating device (E. Baltussen, et al., J. Microcolumn Separations, 11 (1999) 737-747; U.S. Pat. No. 6,815,216), as well as on the inside of narrow tubes coated with solid member through which the fluidic medium is conveyed by conventional pumping (R. Eisert, J. Pawliszyn, Anal. Chem., 69 (1997) 3140-3147; U.S. Pat. No. 5,691,206). While these products may be fit for the analytical sampling purposes for which they were designed, the amount of solid member that can be incorporated will be severely limited in systems where only the external or internal surface has been modified to act as the solid member. Further, since the surface area does not increase linearly with the volume of a reactor where the solid member is deposited on the surfaces only, such systems are also not well suited for up-scaling.

U.S. patent application publication no. 2007/0189115 discloses a hollow magnetic stirrer designed to create an internal flow when rotated. The stirrer is not designed to house any solids for performing biological or chemical transformation, or physical or chemical trapping.

U.S. Pat. No. 6,857,774 B2, representing the closest prior art, discloses a device for cavitational mixing and pumping. This performance of the device described in this piece of prior art is partially based on the same principles as the device of the present invention, i.e., the generation of a flow using a centripetal force field. However, the devices according to U.S. Pat. No. 6,857,774 B2 do not comprise a confinement which can house a solid member for carrying out the transformation and/or trapping actions that are the scope of the invention disclosed here, and the purpose of the devices described in the prior art is fundamentally different, namely to promote cavitation to establish sonochemical reaction conditions in homogeneous solution.

SUMMARY OF THE INVENTION

The present invention deals with a general principle for the design of devices suitable for batch or continuous mode heterogeneous processing in vessels of varying size, and encompasses an entity containing one or more solid member(s) in internal confinement(s), through which the challenge of creating a convective flow of fluidic medium through the internally contained solid member is established simply by rotating, rocking, wagging, or oscillating the device when it is immersed in the fluidic medium. Since the solid member is contained in internal confinement(s) the volume of the solid member will scale linearly with the overall reactor volume, hence providing for a substantially better scalability compared to active rotating sampling devices known from prior art (E. Baltussen, et al., J. Microcolumn Separations, 11 (1999) 737-747; U.S. Pat. No. 6,815,216), where the solid member is coated on the surface only. The present invention also offers considerable design advantages through the confinement of the solid member inside the device, which effectively eliminates problems inherent in a device with a non-contained solid member, such as clogging of vents and filters, caused by wear of the coatings that are deposited on the outer surface.

Accordingly, the present invention provides a device for performing biological or chemical transformation, or physical or chemical trapping in fluidic media comprising:

a flow distributor having at least one fluid medium inlet, at least one fluid medium outlet, and at least one confinement connected to the inlet(s) and outlet(s) wherein the transformation or trapping is performed; and a means for rotating, rocking, wagging, or oscillating the device.

The confinement(s) are spatially arranged within the device so that the centrifugal force, a flow-induced pressure differential, and/or an inertial force are established by rotating, rocking, wagging, or oscillating the device, thereby forcing the fluidic medium in which the device is submerged to flow through the confinement(s) of the flow distributor.

Preferably the flow distributor has one or more central fluid medium inlet(s).

Preferably the flow distributor has one or more peripheral fluid medium outlet(s).

Preferably the confinement(s) of the flow distributor houses one or more solid members that participates in or facilitates a biological or chemical transformation involving at least one agent distributed with the flow, alternatively causing the agent to become trapped by a solid member.

The terms "chemical transformation" and "chemical reaction" are used interchangeable herein and are intended to include both chemical and biological transfomations, as well as chemical and physical trapping.

According to one embodiment of the invention the confinement is positioned symmetrically to the central axis of the flow distributor.

According to another embodiment of the invention the one or more confinements are peripherally located in the flow distributor.

According to one embodiment of the invention the flow distributor has one fluid medium inlet and one or more fluid medium outlet(s) located in a plane above the plane of the fluid medium inlet.

According to one preferred embodiment of the invention the flow distributor has a confinement located so that a fluid medium flows through the confinement before it diverges to the fluid outlets.

According to another embodiment of the invention the flow distributor has a confinement laid out as a spiral-formed flow channel from the central fluid medium inlet to the peripheral outlet.

According to one embodiment of the invention the flow distributor is made from or coated with a material that is able to catalyze at least one agent to undergo a chemical reaction.

According to another embodiment of the invention the flow distributor has the solid member incorporated as a coating that is capable of chemically transforming at least one agent introduced to the flow channel.

According to yet another embodiment of the invention the flow distributor is circular or eliptic in cross-section and provided with a plurality of sectors, each sector being connected with the centrally located fluid medium inlet and a designated peripheral fluid medium outlet Preferably the flow distributor has an outer or peripheral stationary part provided with a plurality of sectors and an inner central part that is adapted to rotate with the means for agitation.

Preferably the sectors are provided, with the same or different solid members, which are made from a material that is capable of biologically or chemically transforming, or trapping at least one agent introduced to the sectors.

According to one embodiment of the invention the means for rotating, rocking, wagging, or oscillating the device is a magnet driven by a fluctuating external magnetic field.

According to another embodiment of the invention the means for rotating, rocking, wagging, or oscillating the device is a solid or hollow shaft mechanically connected to an external actuating device.

Preferably at least one confinement is further equipped with means for providing exchange of matter or energy such as addition of reagents or removal of products and by-products, heating or cooling, or application of acoustic energy, ultraviolet or visible light or other types of electromagnetic radiation, the provision for exchange of matter or energy being contacted to an external source through the actuator shaft.

Preferably the provision for exchange of electromagnetic energy is used to provide microwave radiation, ultraviolet or visible light, and/or acoustic energy to assist reactions taking place in the flow distributor.

Preferably the provision for exchange of mailer is used to provide a gas that can react with at least one agent in the fluidic medium, and/or with at least one agent that is located in the flow distributor, the gas being provided through the actuator shaft.

According to one embodiment of the invention the confinement contains a solid member which is a catalyst.

According to another embodiment of the invention the confinement contains a solid member containing a physically trapped or chemically bonded reagent capable of entering chemical reaction with an agent transported by the fluidic flow.

According to yet another embodiment of the invention the confinement contains a solid member which is an immobilized biological entity capable of transforming agents supplied by the fluidic flow.

According to yet another embodiment of the invention the confinement contains a solid member which is a support material suitable for carrying out solid phase synthesis.

According to yet another embodiment of the invention the confinement contains a solid member which is a solid sorbent capable of trapping matter from the fluidic flow.

According to yet another embodiment of the invention the confinement contains a solid member which is a stationary phase suitable for chromatographic separation.

According to one preferred embodiment of the invention two or more confinements are connected in series, and are filled with different solid members.

According to another preferred embodiment of the invention two or more confinements are connected in parallel and are filled with different solid members.

Preferably the device according to the present invention comprises combination of confinements connected in series and parallel.

Preferably the solid member(s) are provided in one or more cartridges which are placed within the confinement(s). Preferably the cartridges are replaceable for ease of operation.

According to another embodiment of the invention the internal channels of the flow distributor have been laid out so that an internal flow is established mainly by inertial action.

According to another embodiment of the invention the device further comprises a flow-operated valve located between the inlet(s) to the outlet(s) of the flow distributor, where rocking the device or rotation of the device by alternating rotating speed causes liquid to flow from the inlet, to the outlet.

Another aspect of the present invention provides at method for performing biological or chemical transformation, or physical or chemical trapping in fluidic media, said method comprising creating a convective flow of fluidic medium through a device by rotating, rocking, wagging, or oscillating the device, where said device comprises a flow distributor having at least one fluid medium inlet, at least one fluid medium outlet, and at least one confinement connected to said inlet(s) and outlet(s) wherein said transformation or trapping is performed.

BRIEF DESCRIPTION OF THE FIGURES

FIG. 3A shows an empty device, FIG. 3B shows a device where solid member A is incorporated in a single configuration. FIG. 3C a device where solid member a and B are incorporated in a serial configuration. FIG. 3D shows a device where solid members A and B are incorporated in a parallel configuration.

FIG. 7A shows s side view of the device. FIG. 7B shows a top view of the device.

FIG. 9A shows a top view of the device in the plane A-A indicated in FIG. 9C. FIG. 9B shows a top view of the device in the plane B-B indicated in FIG. 9D. FIG. 9C shows a side view of the device in the plane C-C indicated in FIG. 9A. FIG. 9D shows a side view of the device in the plane D-D indicated in FIG. 9A.

FIG. 10A shows a top view of the device in the plane E-E indicated in FIG. 10C. FIG. 10B shows a top view of the device in the plane F-F indicated in FIG. 10D. FIG. 10C shows a side view of the device in the plane G-G indicated in FIG. 10A. FIG. 10D shows a side view of the device in the plane indicated in FIG. 10A.

FIG. 11A shows a top view of the device in the plane I-I indicated in FIG. 11D. FIG. 11B shows a top view of the device in the plane indicated in FIG. 11C. FIG. 11C shows a side view of the device in the plane K-K indicated in FIG. 11A. FIG. 11D shows a side view of the device in the plane L-L indicated in FIG. 11A.

FIG. 12A shows a top view of the device in the plane M-M indicated in FIG. 12D. FIG. 12B shows a top view of the device in the plane N-N indicated in FIG. 12C. FIG. 12C shows a side view of the device in the plane O-O indicated in FIG. 12A. FIG. 10D shows a side view of the device in the plane P-P indicated in FIG. 12A.

DETAILED DESCRIPTION OF THE INVENTION

Figure 1:
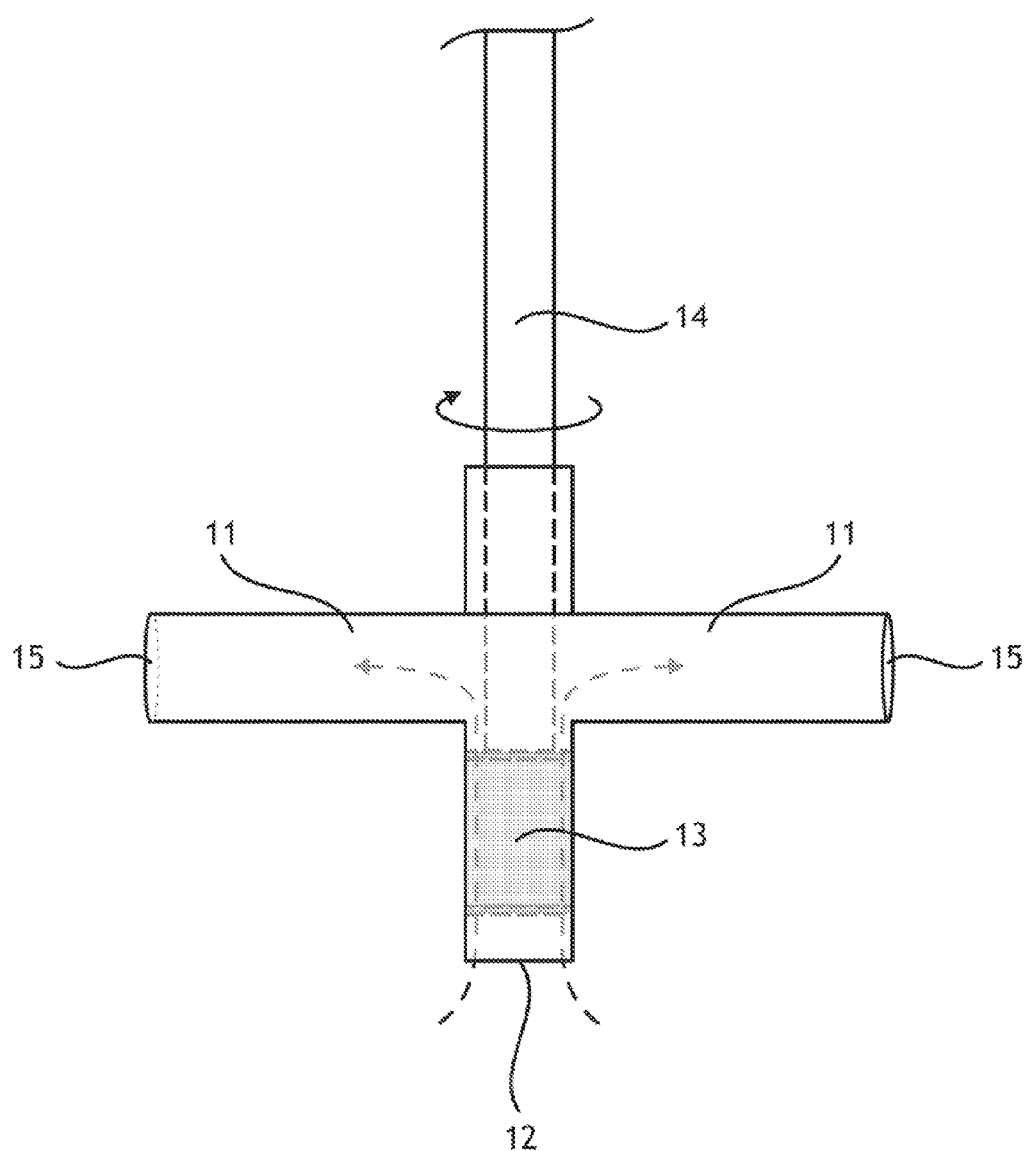
FIG. 1 is a drawing outlining an example of a device according to the invention in its simplest form, actuated by a shaft and incorporating a solid member.

The present invention utilizes a limited number of fundamental physical principles to facilitate the design of a closely related and novel set of devices. The devices according to the present invention, all based on the same set of basic principles, can be utilized to perform biological processes, chemical reactions, or physical or chemical trapping within its confinement(s) when operated in vessels of varying dimensions. In general terms, the present invention relates to a device comprising a flow distributor, having its internal plumbing laid out purposely with at least one fluid medium inlet, at least one fluid outlet, and at least one confinement, combined with a means for agitation of the device by rotating, rocking, wagging, or oscillation (henceforth referred to as "applicable agitation modes") so that either the fictitious centrifugal force related to the rotating reference frame (referred to shorter as "centrifugal force" onwards), the Bernoulli principle acting through the pressure decrease caused by fluidic flow, mainly past the peripheral exits, and/or inertia produced by a rocking, wagging, or oscillating motion, singly or combined, provides the driving force(s) for establishing a flow of fluid medium from the fluid inlet(s) to the fluid outlet(s) through the flow distributor and the confinement(s) of the flow distributor when the device is immersed in the fluidic medium and agitated in an agitation mode applicable for that particular device design variant. The reason why several fundamentally different physical principles are mentioned as being active in establishing an internal fluidic flow in the device, is that more than one of these may be in effect at any given time in a device that has been constructed and operated according to the general principle disclosed here. It will, in fact, be difficult to produce a functional device according to the general principle in which at least the centrifugal force and the Bernoulli principle would lack any significance for establishing a flow of fluidic medium through the device when operated by steady, non-oscillating actuation, as disclosed inmost of the design examples below. The flow distributor so constructed is adapted to allow at least one agent that is conveyed by the fluidic flow, or provided to the flow distributor by other means, to undergo a biological process or a chemical reaction, and/or become physically or chemically trapped. Such processing, reaction, and/or trapping taking place in the confinement(s) of the flow distributor may be accomplished on, or promoted by, interactions with (a) solid reaction member(s) deposited inside the confinement of the flow distributor as a space-filling particulate or monolithic packing, or on its inner surfaces only, and/or by directing into the confinement of the flow distributor electromagnetic radiation such as (but not limited to) ultraviolet light or microwaves, or acoustic energy, through a mechanical actuator element. The invention does not include use of a simple solid member packed in or coated on the inside walls of a container per se, a practice that is well known in many areas of prior art; the inventive moment communicated herein is instead the combination of a device which by itself and due to the layout of its inlet(s), internal channeling, and outlet(s) is capable of establishing an internal flow of fluidic medium when being actuated in one or more of the above the applicable agitation modes, with one or more solid reaction or trapping member(s) contained internally in the device.

Products resulting from reaction(s) taking place inside the device could either be transported out through the outlet(s), or allowed to accumulate on a solid reaction member, for instance in the widely used heterogeneous reaction schemes based an immobilized cells in biotechnology and solid phase synthesis in chemistry. Furthermore, in several of the embodiments described below, devices manufactured according to the disclosed principle can be designed to accommodate more than one solid reaction member, either mixed in a single confinement, or spatially separated in more than one internal confinement, where the confinements containing separated members could be connected either in series or in parallel, or any combination thereof. It would thereby be possible to use any combination of immobilized biomaterials, chemical reagent carriers, reaction supports or catalysts, chromatographic separation media, or trapping sorbents simultaneously in the same device. A particularly valuable envisioned use of a multi-confinement device would be biological or chemical conversion combined with in-line trapping, or sequential reactions with two or more reagents that are antagonistic unless immobilized on solid carriers, the latter well described in prior art (C. V. Pittman, L. R. Smith, *J. Am. Chem. Soc.* 1975, 97, 1749-54; B. J. Cohen, M. A. Kraus, A. Patchornik, *J. Am. Chem. Soc.* 1977, 99, 4165-7; B. J. Cohen, M. A. Kraus, A. Patchornik, *J. Am. Chem. Soc.* 1981, 103, 7620-9; T. H. Maugh, *Science,* 1982, 217, 719-20). A batch-mode bioreactor prone to product down-regulation, or a catalyzed chemical reaction where the catalyst is poisoned by the product(s) are also fully feasible examples of devices according to the invention with in-line trapping of produced material using the technique described here.

The shape of the device could be cylindrical, spherical, cubical, or any other shape through which it possible to establish an internal fluid transport effected by a pressure differential, by centrifugal force, and/or by inertia, forces established solely by rotating, rocking, wagging, or oscillating the device itself.

In one embodiment of the invention, the device is rotated at a constant or varying angular velocity, and comprises at least one confinement suitable for carrying out biological or chemical reactions, or physical or chemical trapping. The confinement(s) to be transited or percolated by a fluid medium flow is(are) preferably positioned symmetrical to the rotational axis of the flow distributor, so that the fluid medium flows through the confinement(s) before it diverges into the fluid outlet(s). Alternatively, one of more confinement(s) is(are) located peripherally in the flow distributor, where they are transited or percolated by a flow of fluidic medium that has been manifolded from a single fluid medium inlet, in case a plurality of confinements is used. Preferably, according to the embodiment, the flow distributor has one fluid medium inlet located near or at the momentum axis and two or more fluid medium outlets located close to the perimeter of a circle described by the device then agitated around the central axis or its center of mass. Preferably the flow distributor of the device according to the invention comprises one or more confinements that could either be empty or filled with a solid member. The solid member housed by these confinements can comprise immobilized biologically active materials such as cells or fragments thereof, a catalyst capable of promoting a chemical reaction, a stationary phase that can carry out separations according to the principles of chromatography, a sorbent that can effectuate selective trapping of one or more agents transported by the fluidic flow, a porous or non-porous solid reagent carrier, or a porous or non-porous solid reaction support, where the reagent carrier or reaction support may contain covalently or non-covalently bonded reagent(s), trapped liquid(s) or gas(es), or any other material that can react with at least one agent comprised in the fluidic medium, or, through the hence established fluid transport, with one or more agents that is/are located in the flow distributor. In a preferred alternative of this embodiment, the reaction confinement is located centrally in the flow distributor and meets a medium flow from a central inlet of the flow distributor which is provided with two or more peripheral exits.

In yet another embodiment of the device, the flow distributor is circular or elliptic in cross-section and provided with a plurality of confined sectors, with each sector connected with the centrally located fluid medium inlet and a designated peripheral fluid medium outlet. The compartments thus sectorized can optionally be left empty, have their surfaces coated by, or be filled with, identical or different solid member(s) made from fluid-permeable material(s) that is/are capable of either trapping, or entering into a biological or chemical transformations of, at least one agent introduced to the sectors by the fluid medium, or provided to the sectors in alternative ways. In one advantageous alternative, the flow distributor has a non-rotating outer (peripheral) stationary part provided with a plurality of sectors, and an inner central part that is adapted with a means for rotation. Advantageously, as with the inertial device described below, such a design with a rotating core element and a static peripheral element counteracts the tendency of the bulk fluid medium to move with the means for rotation, which supports the efficacy of the device as a reactor by supporting a high internal flow from the central inlet to the outlets located at the periphery of the device without resulting in formation of a rotational vortex.

In the so described embodiments, the means for rotating, rocking, wagging, or oscillating the device are well described in prior art, and can either be a direct mechanical connection to an external actuator, or indirect coupling to an external force field, notably, but not limited to, the coupling of a ferromagnetic element contained in the device to a fluctuating external magnetic field, the fluctuating field being established either by properly positioning in the vicinity of the device a ferromagnetic or electromagnetic field source actuated by mechanical means, or a plurality of stationary electromagnets that are actuated by an electronic circuit in the proper sequence required for that particular agitation mode (in its essence constructed according to the prior art principles disclosed by Zipperer (U.S. Pat. No. 3,554,407)) which effectively converts the device into the rotor of an electric motor through its internal ferromagnetic element. A particular advantage with the electromagnetic coupling scheme is that all forms of agitation disclosed as possible for establishing an internal fluid flow through the flow distributor in this invention (rotating, rocking, wagging, or oscillation) can be implemented by purely electromagnetic means without the need for moving parts, by properly positioning and sequentially actuating the electromagnets in a variety of spatial configurations. Means for rotating, rocking, wagging, or oscillating the device based on the electromagnetic coupling principle are furthermore advantageous when an explosion risk is at hand, as well as in sealed reactors where mechanical shafts impose a leakage problem.

The flow distributor can optionally be filled with a fluid-permeable material that is capable of catalyzing at least one agent in the fluidic medium to undergo a chemical reaction. In another alternative, the channel is shaped into a spiral which surface is coated with a material that is capable of chemically transforming at least one agent introduced to the flow channel. When combined with a check valve in the central inlet such a spirally shaped confinement fulfills the channel orientation criteria for an inertial device, as outlined in the below preferred embodiment.

In the described embodiments, a flow distributor that is directly connected to a mechanical actuator can further be equipped through the actuator coupling with a means for providing exchange of matter or energy, such as addition of reagent and/or removal of products or by-products, heating or cooling, introduction of acoustic energy, or application of electromagnetic radiation such as an integrated source of, or a waveguide for, light of different wavelengths (ultraviolet, visible, or infrared), or microwave radiation, designed to be connected with one or more reaction confinement(s) of the flow distributor. The provision for exchange of matter or energy hence established is generally contemplated to provide a suitable set of physical conditions for bringing about a specific desired biological or chemical reaction, or to control, accelerate, or delay a biological or chemical reaction. In one alternative, the provision for exchange of matter or energy is preferably connected to an external source through the actuator shaft. Introduction of such a device into a reaction vessel can create a local reactor inside the vessel, with means for exchange of above the matter or energy, as well as for transmission of signals from any sensor that may be positioned within the flow distributor, through the actuator shaft.

Devices constructed according to the disclosed general principle are applicable with a variety of biological or chemical reactions or processes, including, but not limited to cell culture, biocatalysis, enzyme engineering, ion exchange processes, selective removal by solid supported, scavengers, catalysis with heterogeneous catalysts, Grignard reactions or any form of metal reagents, linkers, oligonucleotide or peptide synthesis, and organic synthesis.

What has been outlined in general terms are the important features of the invention in order that the detailed description thereof may be better understood, and in order that the present contribution to the an may be better appreciated. Additional features of the invention will be described hereinafter in the detailed description of invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Once the general principle has been validated, a variety of device designs can be envisioned to fulfill the general principles of operation, as outlined in the preceding parts of this disclosure. A summary of example designs follows. It should be understood that these serve as examples only of the general principle of establishing internal flow through a reactor device by its movement. The scope of the invention shall thus not be limited designs made according to these examples.

In the embodiment depicted in FIG. 1, the chemical reactor device is a generally hollow tubular entity rotated in a fluid medium by mechanical force through a shaft, that can also act as an integrated means for providing exchange of matter or energy. Arrows in FIG. 1 indicate fluid flow (dotted line) and rotation (solid line), respectively. The device has flow distributor (11) which in cross-sectional view is generally T-shaped. A fluid inlet (12) is axially located and so is the reaction confinement (13), towards which the actuation shaft (14) is extended. In this embodiment the actuation shaft (14) is the means for rotating, rocking, wagging, or oscillating the device. This shaft can be hollow to allow incorporate means for transferring ancillary reactants, products or by-products, heat, acoustic energy, or electromagnetic radiation such as (but not limited to) ultraviolet light or microwaves. When such a device is rotated, a pressure differential is established from the axial inlet (12) to the peripherally located outlets (15) due to the Bernoulli effect acting on outlet orifices. This pressure differential is augmented by the centrifugal force, which assists in forcing the fluid from the axial inlet of the rotating hollow device, through its (generally tubular) body, and out through the outlets located at the distal ends of the rotating flow distributor (11). A flow of fluid medium is thus created through the device, from the central inlet to the openings in each rotationally peripheral end. The depicted embodiment of the device in FIG. 1 shows two horizontal exits and a generally T-shaped cross-section. It is, however obvious that any number of rotating elements can be connected to a central inlet arranged in this embodiment to establish a device operating through this general principle.

Figure 2:
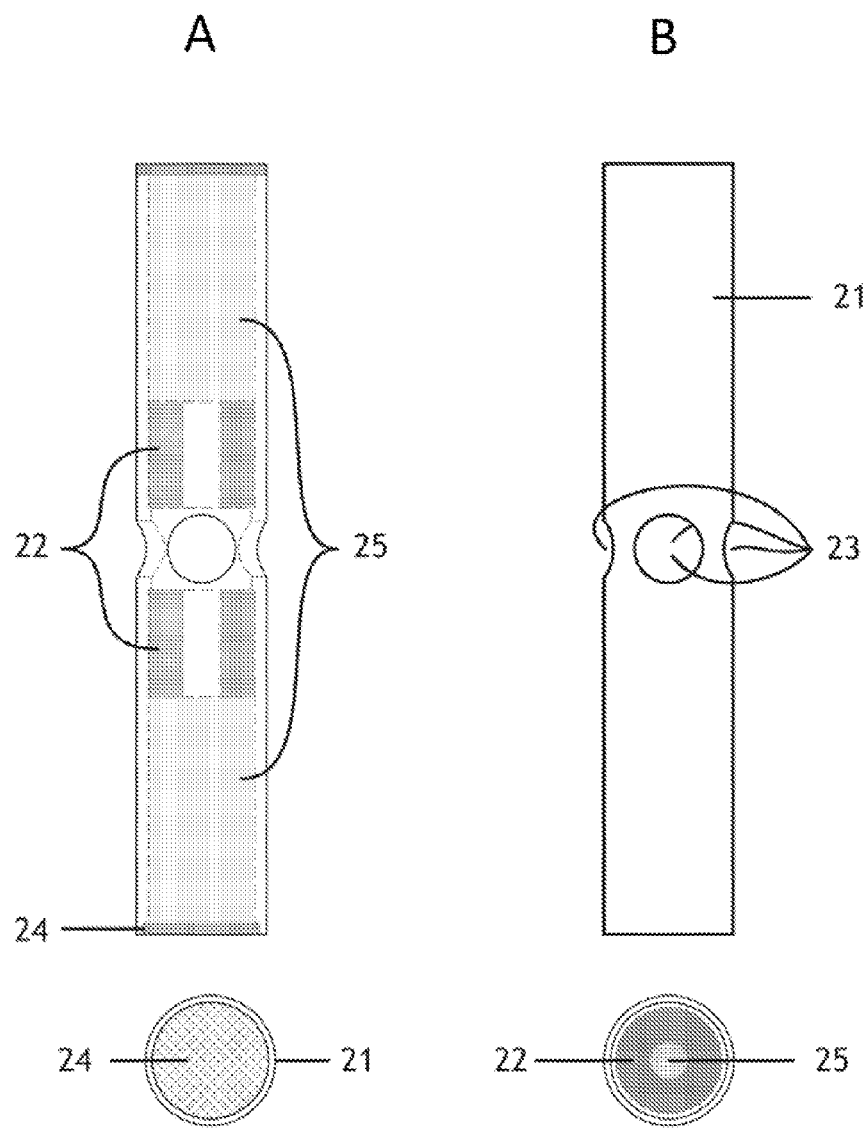
FIG. 2A shows a solid and FIG. 2B shows a cross-sectional view of a magnetically actuated tubular device of the invention constructed according to the general principles of the invention, based on the centrifugal force and possibly also the Bernoulli effect.

FIG. 2 shows lateral and axial solid and cross-sectional views of an embodiment of the invention constructed as a tubular magnetically actuated entity, where the principles of operational are a combination of centrifugal force and the Bernoulli effect, as outlined for the embodiment constructed according to FIG. 1. The device in FIG. 2 comprises a tubular body (21) equipped with two internal cylindrical magnets (22), four center holes acting as inlets (23), and two peripheral outlets provided with retaining, filters or frits (24). Solid member(s) may be housed in both confinements (25) of the device.

Figure 3:
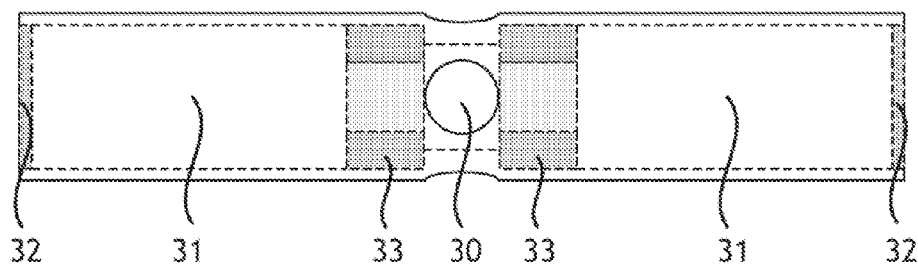
FIG. 3 illustrates how two pairs of identically shaped solid members A and B, carrying different functionalities, can be incorporated in serial and parallel fashion.
Figure 3:
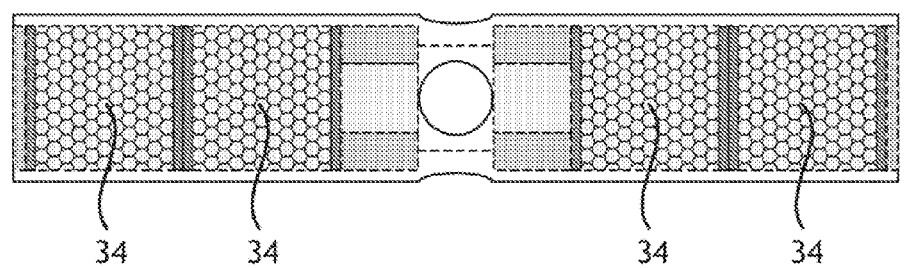
Figure 3:
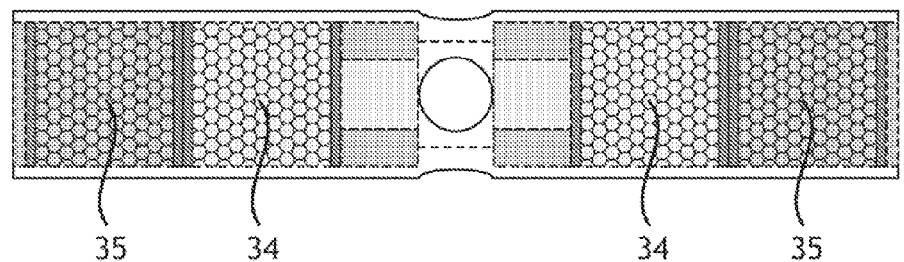
Figure 3:
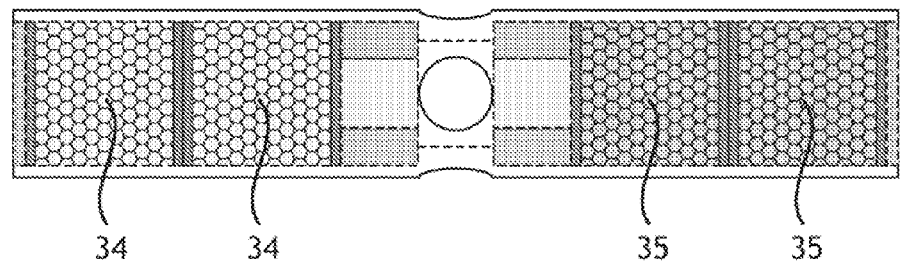

FIG. 3 serves as a principle illustration of how devices embodied according to the invention can be operated with two or more solid members in series and parallel fashion, as demonstrated with a tubular twin chamber magnetically actuated device that is constructed essentially according to FIG. 2. By rotating the device depicted in FIG. 3, fluid medium is aspirated through the four inlet holes (30) located on the rotational axis and diverted from there into the two confinements (31) located in each of the two rotating arms of the device, where it is forced towards the peripheral outlets (32) by the combination of centrifugal force and pressure differential acting on the fluid. Indirect magnetic actuation is in this example illustrated by means of two integrated tubular permanent magnets (33), set to interact with an external rotating magnetic field. In this particular embodiment, each of the rotating arms of the device is constructed to house two solid members of different functionality. Solid member A and Solid member B, both implemented as identically shaped interchangeable cartridges (34) and (35) with integrated filters/frits, that can be stacked inside the device. For clarity, FIG. 3a shows the empty device, which in FIG. 3b has been fitted with four cartridges (34) containing Solid Member A (34), forming a reactor with a single functionality. FIG. 3c shows the device operated in series interaction mode with one cartridge (34) each containing Solid member A and one cartridge (35) containing Solid member B stacked in each arm; the cartridge (34) containing Solid member A located close to the inlet and the cartridge (35) containing Solid member B close to the peripheral outlets. The fluid diverted from the inlet into each chamber is first forced to percolate through cartridge (34) containing Solid Member A and directly thereafter through cartridge (35) containing Solid Member B. FIG. 3d shows the device configured to operate in parallel fashion, with the left arm fitted with two cartridges (34) containing Solid Member A and the right arm with two cartridges (35) containing Solid Member B. Reaction schemes requiring sequential interaction with Solid Member A followed by Solid Member B without intervening liquid phase reaction (for instance direct in-line trapping by Solid Member B of products or by-products produced in Solid Member A) will benefit from a series configuration, whereas, e.g., schemes where further reaction(s) should take place in the fluid phase between the sequential treatments with Solid Members A and B will benefit from a parallel configuration. Obviously, the number of different processing steps that can be implemented is not limited to two as in this example; a device constructed according to FIG. 5 has, for instance the capacity of parallel processing with four solid members, whereas dividing elements (63) and (64) of FIG. 6 can accommodate six and three solid members in parallel, respectively. It is also obvious that the thickness of the cartridges cart be adjusted to allow more than two solid member cartridges to be entrained in a serially configured processing scheme, and equally obvious that the thickness of each solid molter layer can be designed at will to optimize a particular reaction scheme when several layers are implemented without being bound to a cartridge format.

Figure 4:
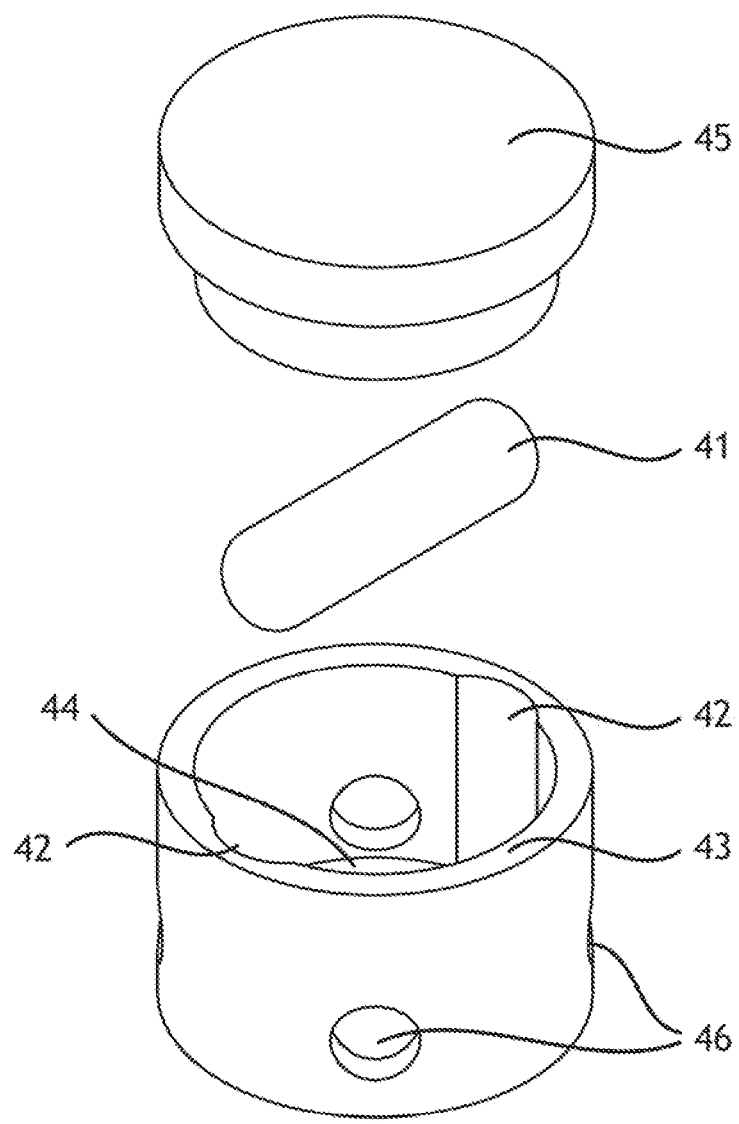
FIG. 4 shows a device of the invention formed as a hollow puck-shaped where a conventional solid magnetic spin bar is used both for actuation and for dividing the interior space into two separate compartments.

FIG. 4 shows an embodiment of the invention laid out as a hollow puck-shaped device with a conventional solid magnetic spin bar (41) press-fit into two vertical grooves (42) machined in the inner wall of the cylinder (43), to effectively establish two separate compartments inside as the magnet becomes diametrically confined inside the cylinder between the bottom (44) of the cylindrical body and the lid (45). For each of the thusly formed compartments two holes (46) are drilled in the outer wall; one acting as an inlet and the other as an outlet, depending on the rotation direction of the device. The central inlet with an integrated frit is located axially in the bottom of the device and is obscured by the wall in FIG. 4.

Figure 5:
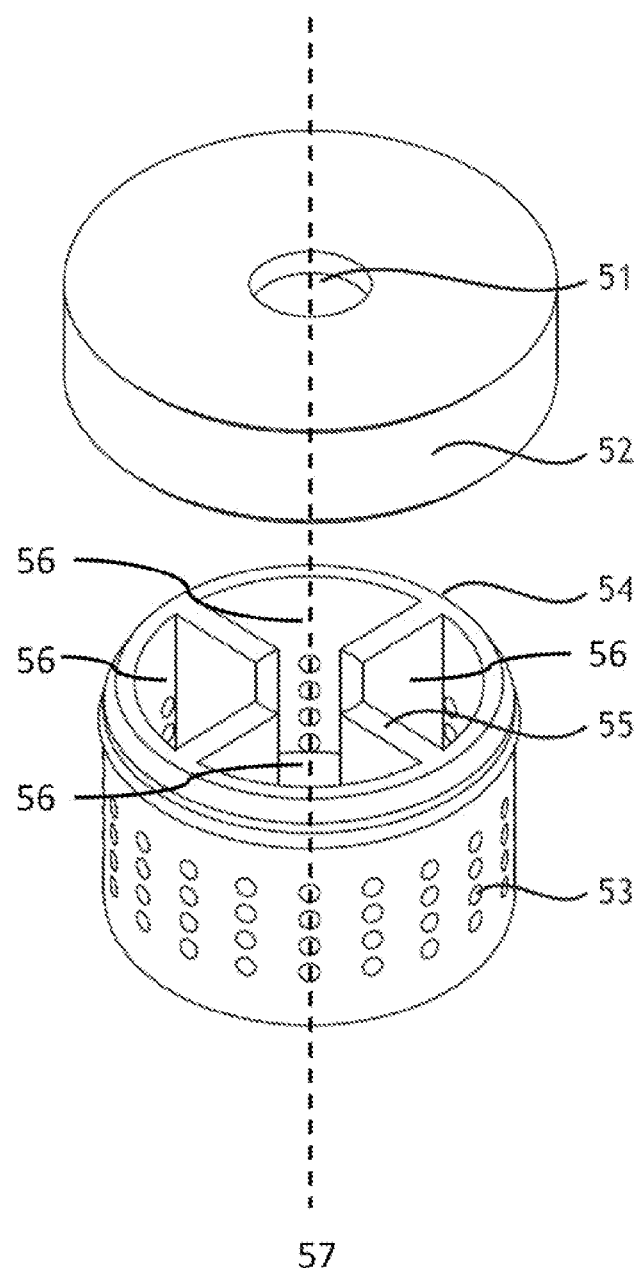
FIG. 5 shows a device of die invention formed as a hollow puck with fixed sectors, that can be adapted either for mechanically or magnetically coupled actuation.

Another puck-shaped embodiment is shown in FIG. 5, with an inlet hole (51) in the center of the removable lid (52) and a plurality of small outlet holes (53) on the sides of the body (54). Four walls (55) divide the internal volume into four separate sectors (56). Solid members designed to fit into the sectors can be easily interchanged and solid members of different functionality can be used in each sector for parallel processing of agent(s) transported by the fluid flow, as described in detail above. The puck-shaped device has an increased packing aspect ratio (area perpendicular to the flow direction divided by the packing depth) compared to the tubular device in FIG. 3, giving a higher flow through the solid member. The relative volume of medium that is influenced by the higher centrifugal force in the peripheral part of the confinement is also increased, and a larger mass of fluid will therefore contribute to the suction forcing the fluid flow from the inlet, distributing it from the central inlet to the separate confinements defined by the four separating walls (55) and finally to the peripheral outlets (53). As drawn in FIG. 5, this particular embodiment is adapted for magnetic actuation by means of a permanent magnet embedded in the bottom wall with its magnetic field lines aligned diametrically (not shown). An alternative configuration for this embodiment would be to attach a mechanical actuation shaft, possibly hollow to incorporating a means for exchange of matter or energy as described above, in lieu of the inlet hole (51) and instead implementing the inlet as an identically shaped orifice located axially in the bottom wall of the device. (57) is the central axis of the flow distributor.

Figure 6:
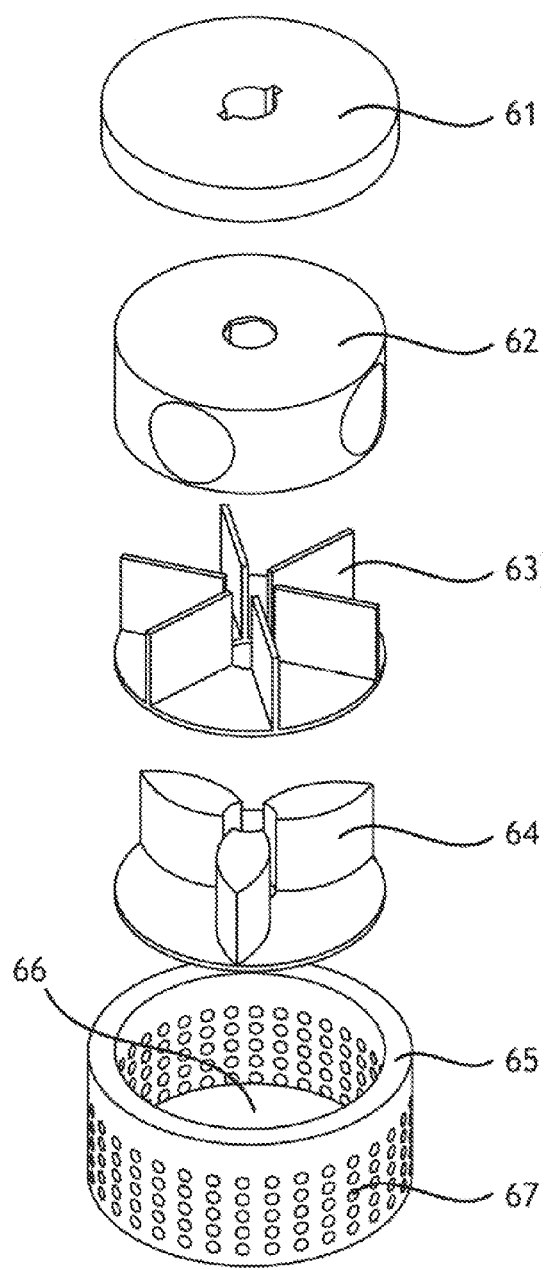
FIG. 6 shows a device of the invention and designed as a hollow puck with exchangeable inserts.

FIG. 6 shows yet another embodiment where the flow distributor is constructed as a hollow puck with an interchangeable set of inserts (62, 63, and 64) which are constructed with radially arranged dividing elements designed to split the rotated confinement defined by the body (65) and its lid (61) into a plurality of sectors. Each sector is connected to an axial fluid medium inlet (hidden in the drawing by the wall of the body (65)) located in the bottom wall (66) of the device and the peripheral fluid medium outlets are implemented as a plurality of holes (67) drilled in the cylindrical wall of the hollow puck-shaped body (65). Actuation could be accomplished either by (a) magnet(s) embedded in the rotating dividing element (part 64 illustrates a dividing element with provision for housing up to three embedded magnets) or in body of the hollow puck, or alternatively, by direct mechanical coupling to a shall connected to the central axis through the lid (61).

Figure 7:
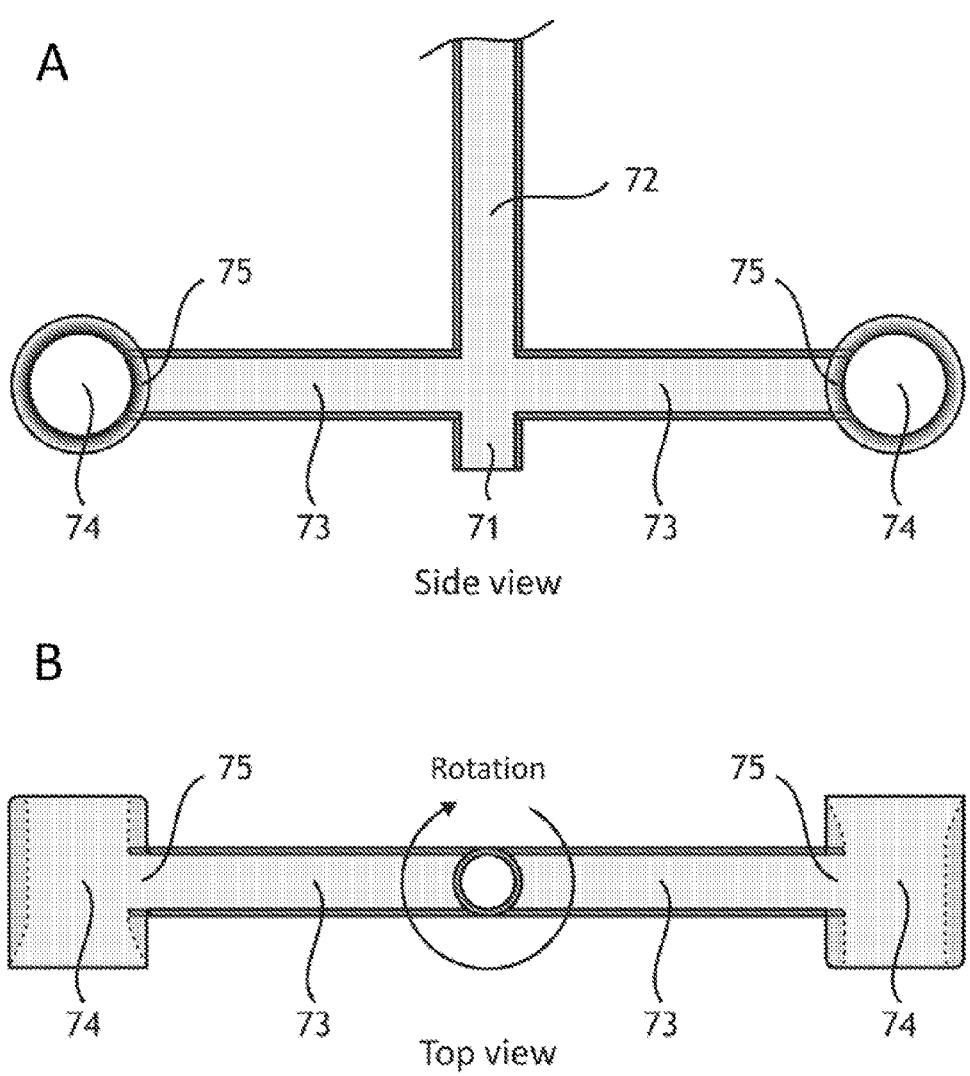
FIGS. 7A and 7B show a mechanically actuated device of the invention designed to operate predominantly according to the Bernoulli principle.

In yet another embodiment, shown in FIG. 7, a device bearing some similarity to the one in FIG. 1 is laid out to operate with an enhanced contribution from the Bernoulli principle. The fluid is drawn into the central inlet (71), which can optionally be designed to contain a solid member and adapted with means for exchange of matter or energy through the mechanical actuator shaft (72) in the manner shown for the device in FIG. 1. After having passed through the inlet section, the fluid flow is thereafter diverted into a hollow rotating element forming two arms (72) of equal length rotating perpendicular to the axis, both arms being suitable for housing solid member(s) in series or in parallel, configurations explained in FIG. 3. The distal end of each rotating arm is connected to a short venturi tube (74), constructed per se according to principles that are well known in prior art. This pair of venturi tubes is mounted in opposite direction, perpendicular to the peripheral exit (75) of each arm, and with their through paths axes aligned with the plane described by the circular motion of the arms (73). When actuated as indicated by the arrow in FIG. 7, the rotation causes fluid to flow through the venturi tubes (74), whereby the faster moving liquid passing the outlets (75) will cause a decrease in pressure, according to the Bernoulli principle. The pressure differential between the central inlet (which much less affected by the Bernoulli effect) and the peripheral exits connected to the venturi tubes causes fluid to flow from the inlet to the outlets. The device is mechanically actuated by a hollow shaft (72), the lumen of which is well suited to act as a conduit for transfer of thermal energy, electromagnetic radiation, or for addition of chemical agents and product/by-product removal.

Figure 8:
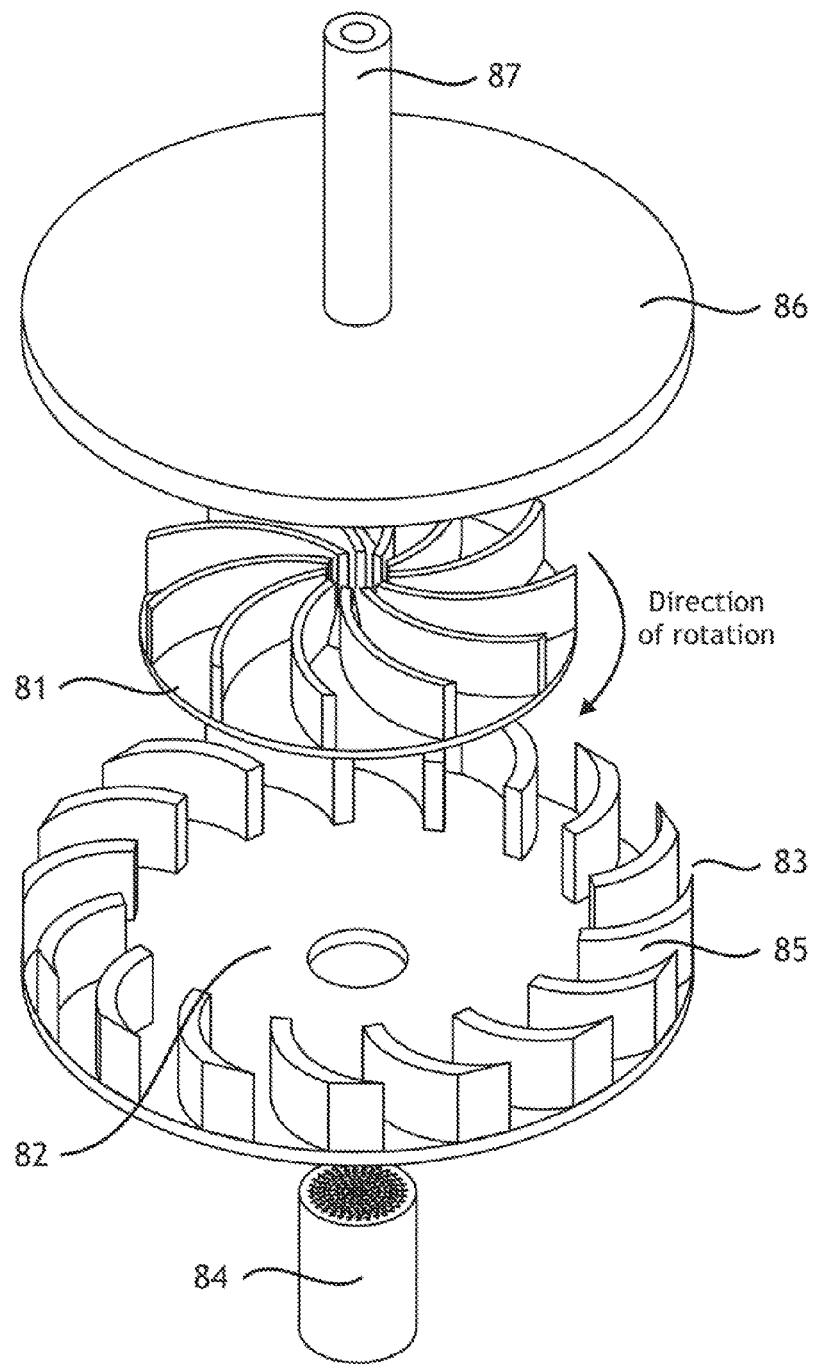
FIG. 8 shows a device of the invention constructed with a rotating inner part and a static outer part designed to minimize vortex formation.

FIG. 8 shows an exploded view of a four part device of the invention, embodied by an internal element (81) that rotates clockwise, with all other parts kept static. Rotating the internal element (81) as indicated by the arrow in FIG. 8 creates a flow into the static element (82), where a plurality of peripheral outlets (83) are located. Solid member(s) can be included in several confinements in the drawn example; integrated with the central inlet (84), in the internal rotating element (81), and/or in the flow channels (85) of the static element (82). The device is covered by a lid (86) joined with the static element (82), the lid having a passageway for allowing a mechanical shaft (87) to actuate the internal rotating element (81), the actuator shaft optionally being hollow and equipped with a means for exchange of matter or energy. A device constructed according to this principle has the advantage of establishing a strong flow without causing a rotational vortex in the bulk fluid medium.

Figure 9:
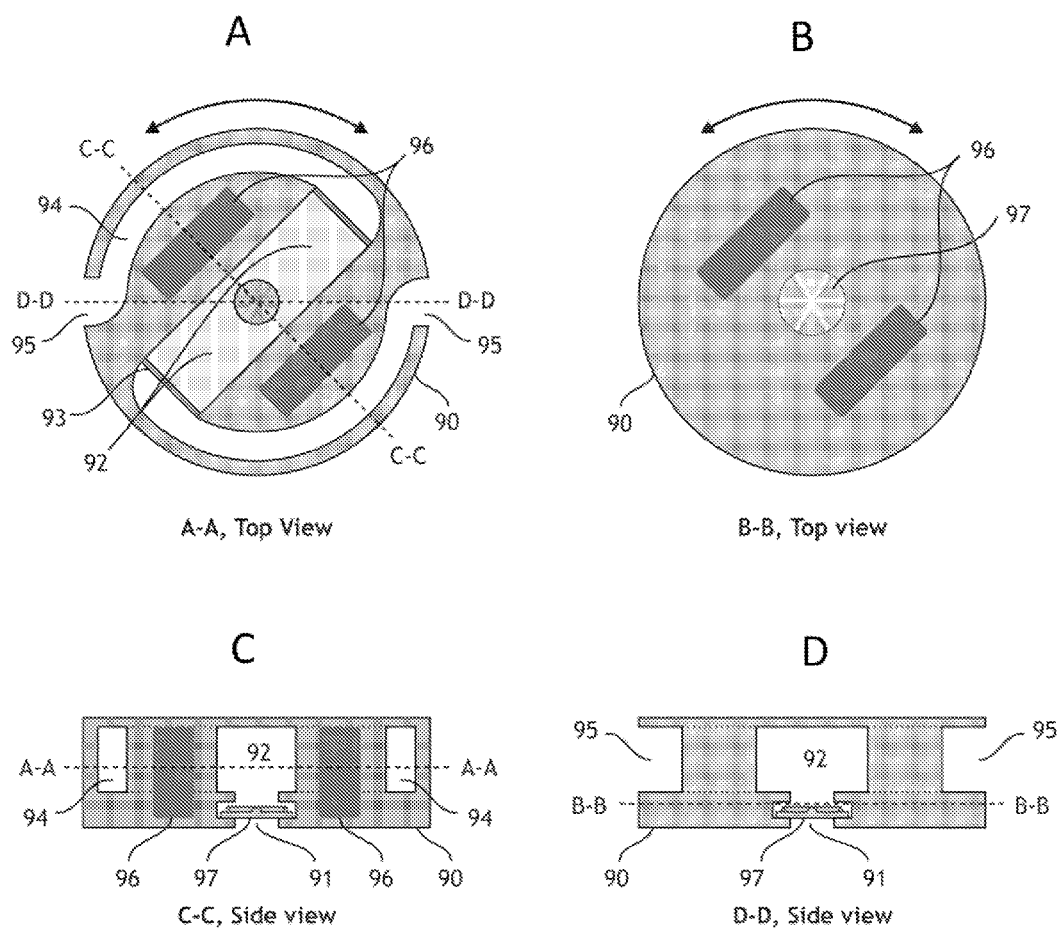
FIGS. 9A-9D show a device of the invention based mainly on the principle of inertia, with peripherally arranged fluid outlets.

In yet another embodiment of the device, illustrated in FIG. 9, one or more of the flow channel(s) of the flow distributor is/are laid out with part of its/their peripheral paths aligned with, and positioned close to, the circumference of the rotation plane described by the device when it is pivoting around its axis; the orientation of the section(s) of the flow path(s) hence deviate(s) significantly from the predominantly radial direction devised in the embodiments shown in figures referred to hitherto. A flow distributor with its flow channel(s) laid out in this way is preferentially combined with a flow-operated check valve (designed per se according to principles well known in prior art) located in the central fluid medium inlet, which is designed to allow the fluid medium to flow freely in through this inlet, but blocks it from exiting there. The peripheral exit(s) can be left open. When laid out according to these criteria, the device is designed to operate mainly according to the principle of inertia, where either alterations up and down in the angular speed of a continuous rotation pattern, or alternatively rocking the device back and forth by an oscillating rotational movement that integrates to zero net rotation over time, will result in fluid flowing through the confinements of the flow distributor, mediated by the inertial action of the angular acceleration/deceleration on the fluid in the peripheral section(s) of the flow channel(s) that is(are) aligned with the direction of rotation. Thus, in the device variant shown in FIG. 9, the flow distributor has a puck-shaped body (90) with an inlet (91) at the bottom, positioned centrally with respect to the rotational axis. This inlet comprises a small cylindrical compartment that retains a loosely fit elastomeric disc (97) which has a flat bottom and a pattern of radially oriented ridges on the upper surface in order to form an integrated check valve, the principle of which is well known per se in prior art. The flat bottom surface of the valve membrane will block fluid from flowing out of the device through the inlet, whereas the radial pattern of ridges on the upper surface of the membrane allows fluid that flows past the loosely lit membrane to enter into the device. The valve hence allows the fluidic medium to be drawn into the confinement (92) that is adapted to accommodate (a) solid member(s), which (if necessary) is/are kept in place by a suitable mesh or frit (93). The solid member confinement (92) is oriented radially relative to the rotation axis, which is perpendicular to the centrum point of the drawing plane in section A-A of FIG. 9. The confinement (92) is in turn connected to the inertial channels (94), which are oriented along with the circumference of the puck-shaped body (90) close to its cylindrical wall. This circular orientation ascertains that inertial force will act on the fluidic medium in the inertial channels (94) to cause a complete pumping action from the inlet (91) to the outlet(s) (95) whenever the angular velocity of the device goes through an acceleration/deceleration cycle, but not when it is rotating at a steady rate. The angular acceleration/deceleration required to establish the inertial pumping can be created either by rocking the device back and forth without a net rotation over time, or by alternations up and down in the angular velocity of a continuous rotation. A particular advantage of this embodiment is that the internal flow through the flow distributor and its agitation of the bulk fluidic medium can be individually tuned without giving rise to vortex formation.

Figure 10:
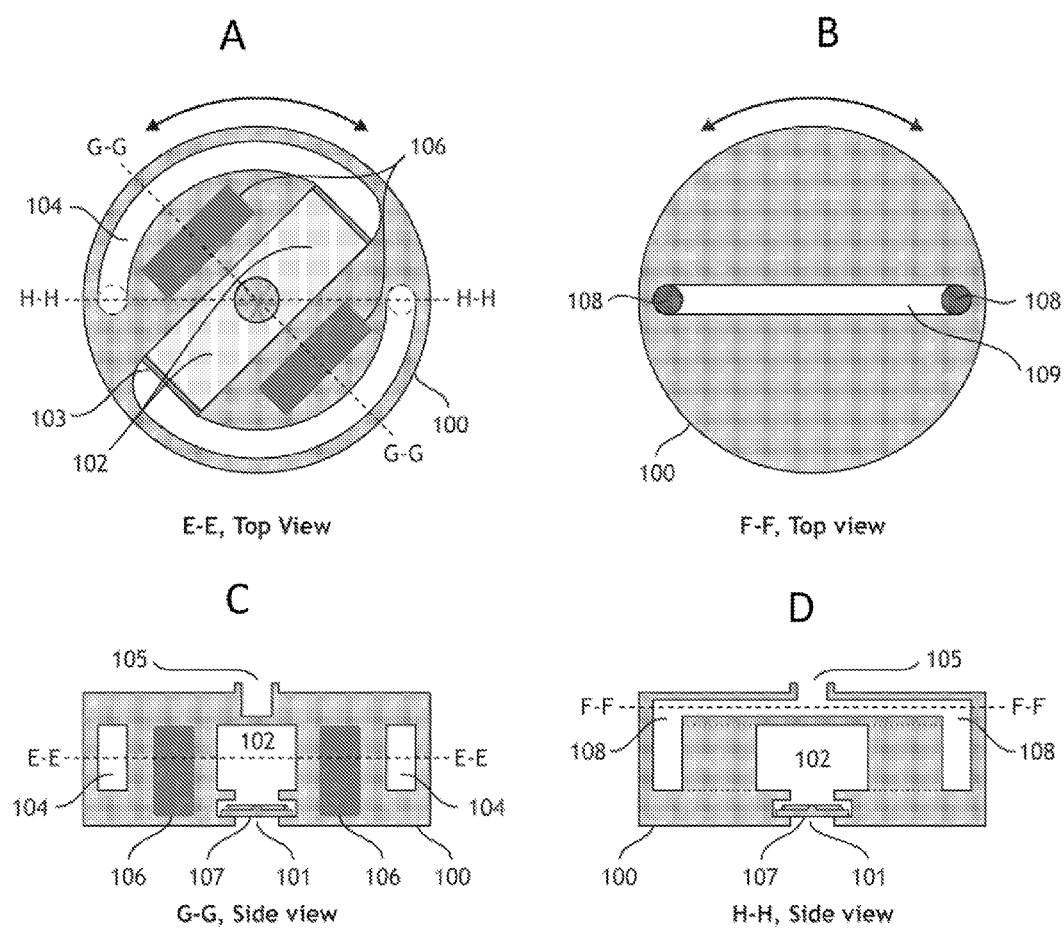
FIGS. 10A-10D show a device of the invention based mainly on the principle of inertia, with a centrally arranged fluid outlet, suitable for stacking.

It is realized that the fluidic flow through a device with two peripherally located outlets as disclosed in FIG. 9 will be under influence of both inertial, centrifugal, and Bernoulli forces. An alternative arrangement of the outlet channels, to form a device that operates almost solely on the basis of inertia, is shown in FIG. 10, which has the added benefit of having the fluid flow outlet located centrally to the device. In this embodiment, which can be described as an alternative outlet variant of the device shown in FIG. 9, the fluid flow is not allowed to escape the flow distributor through a pair of peripherally located outlets (95) as in the device shown in FIG. 9, but instead guided from the inertial channels (104) towards a single outlet (105) that is positioned on the rotational axis. This is accomplished by means of an internal pair of short vertical channels (108) which lead to a separate diametrically oriented channel (109) located on top of the confinement (102) and the inertial channels (104). Also shown are the puck-shaped body (100), a mesh or frit (103), and valve (107) similar to the valve (97) in FIG. 9, described above. The fluid flow established by the angular momentum acting on the fluid in the inertial Channels (104) is thereby channeled back towards the rotational axis of the device (against the centrifugal force) and routed to exit through a single outlet (105) which is designed to fit exactly into the central inlet (101) of the device. This configuration not only has the obvious advantage of allowing several devices to be stacked for operation in series; it also has an additional advantage in that the internal fluid flow will be governed practically only by inertial forces, since i) the centrifugal force is nullified by rerouting the fluid back to the rotational axis; and ii) the Bernoulli effect is negligible since both the inlet and outlet are situated on the rotational axis. Hence, by applying a sequence of angular accelerations and decelerations in a stepwise fashion, the fluid flow can be rapidly altered. It is thus possible to carry out stopped flow reactions in a single solid member, or stepped transfer between two or more solid members connected in series by stacking. Although the device examples shown in FIGS. 9 and 10 are both equipped with magnets (96 and 106, respectively) for (electro)magnetically coupled actuation, it is obvious that the principle can be implemented equally elegant by mechanical coupling through a shaft, preferentially attached to and integrated with the central inlet, in which case the shall can also provide a means for exchange of matter and energy with the enclosed solid member. Alternatively, if a device constructed according to FIG. 10 is combined with mechanical coupling through a hollow actuator shaft through the central outlet, the fluid being pumped out of the reactor can be conveyed from the reaction vessel by means of the actuator shaft.

Figure 11:
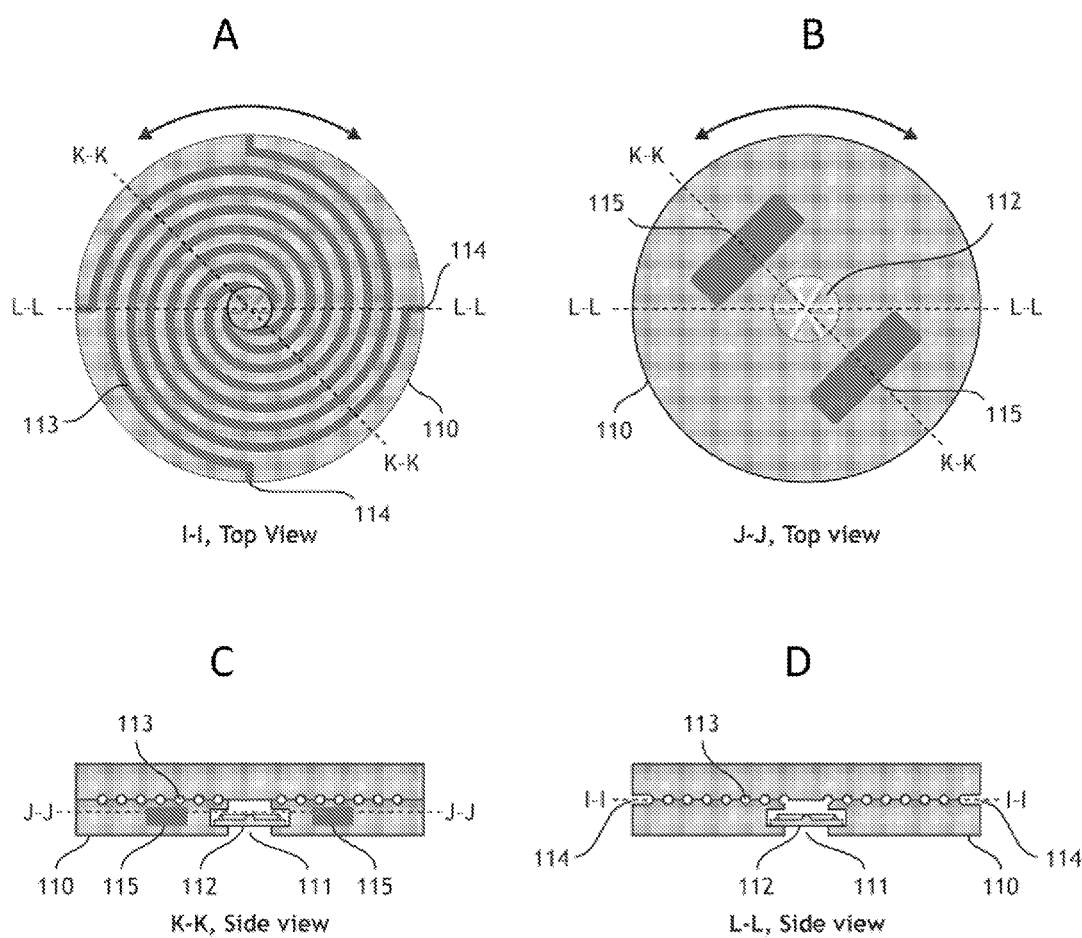
FIGS. 11A-11D show a device of the invention based mainly on the principle of inertia, with internal flow channels routed as multiple parallel archimedean spirals.

A device operating mainly according: to the principles of inertia can also be realized by routing the internal flow channel as a single or multiple parallel archimedean spiral(s), as embodied in FIG. 11 where four archimedean spirals (113) have been laid out in parallel. In this configuration the spirally shaped channels combine the functions of a confinement for housing solid member(s), and that of inertial channel(s) (since the archimedean spirals are oriented largely as stipulated for the inertial segments of the internal channeling in the embodiment shown in FIG. 9). Due to the advantageous surface-to-volume of the spirally arranged channels, this embodiment is particularly useful when solid members are to be implemented as a coating on the flow distributor surface. The principle of operation is very similar to the embodiment shown in FIG. 9 and needs no further explanation; the main difference is that the device of FIG. 11 lacks a separate compartment for housing solid member(s). Instead, the archimedean spirals double as compartments and inertial channels. Also shown are puck-shaped body (110), the central inlet (111) of the device, valve (112) similar to the valve (97) and (107) described above, peripheral outlets (114), and magnets (115).

Figure 12:
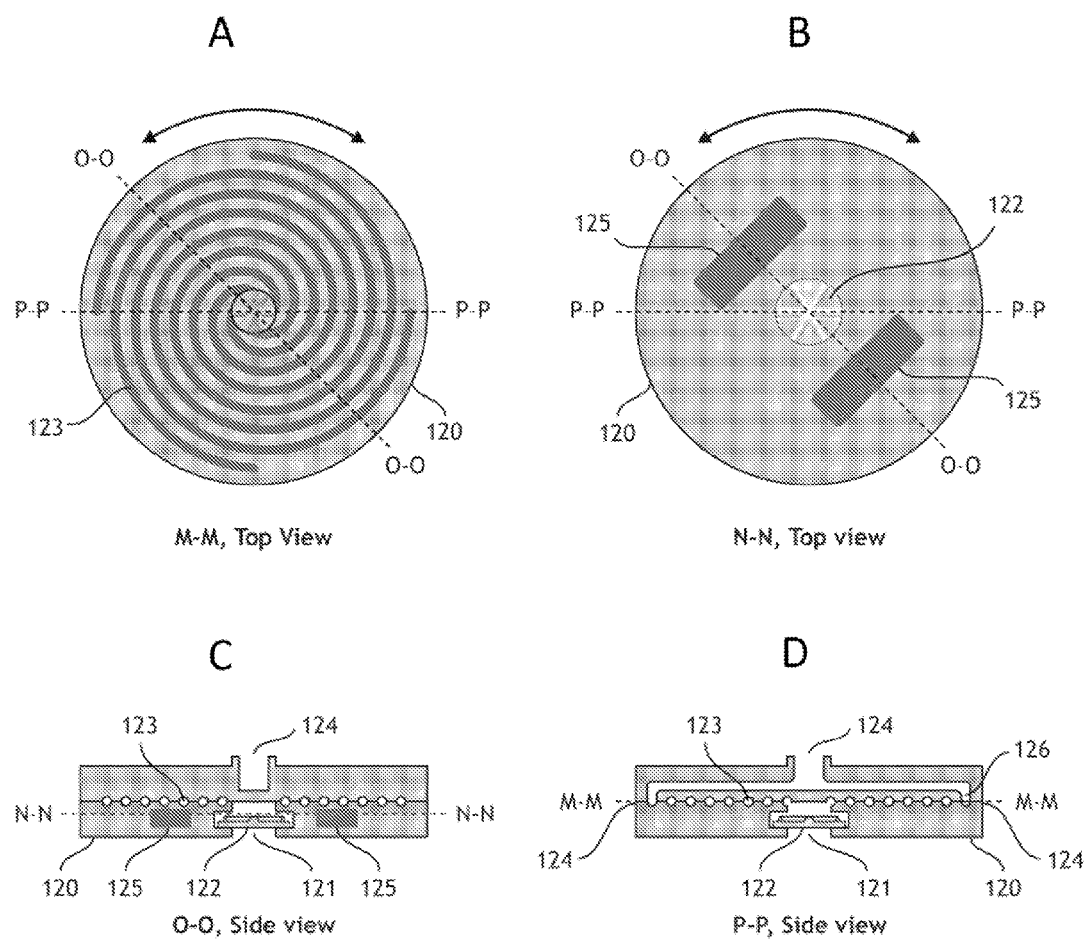
FIGS. 12A-12D show a device of the invention based mainly on the principle of inertia, with internal flow channels routed as multiple parallel archimedean spirals and where the outlet is routed back to the central axis.

The final embodiment disclosed is shown in FIG. 12 and represents a variant of the inertial device based on archimedean spirals of FIG. 11, where the outlet of the archimedean spirals (126) is routed back to the central outlet (124). The principle and advantages of this outlet routing variant was discussed for the device disclosed in FIG. 10 above, and need not be repeated here. Also shown are the puck-shaped body (120), the central inlet (121) of the device, valve (122) similar to the valve (97) and (107) described above, four archimedean spirals (123), and magnets (125).

The means for by rotating, rocking, wagging, or oscillating of a device according to the invention can be the actuator shaft (14) (FIG. 1), (72) (FIG. 7), and (87)(FIG. 8); or a magnet (22)(FIG. 2); (33)(FIG. 3), (41)9FIG. 4), (96)(FIG. 9), (115) (FIG. 10), (115)(FIG. 11), and (120(FIG. 12), the magnet being contained in the device driven by a fluctuating external magnetic field, said fluctuating field being established either by properly positioning in the vicinity of the device a ferromagnetic or electromagnetic field source actuated by mechanical means, or a plurality of stationary electromagnets that are actuated by an electronic circuit in the proper sequence required for that particular agitation mode.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Example 1

Three identical cylindrical devices were prepared essentially according to FIG. 2 from 46 mm long pieces of poly (tetra fluoroethylene) (PTFE) tubing with inner and outer diameters of 6.3 and 6.5 mm, respectively. A 2 mm diameter drill was used to prepare two pairs of holes perpendicular to each other in the middle of each tube, where after two annular rare earth permanent magnets were inserted from each end and press-fit into the tubes as far as possible without obstructing the central inlet holes. Punched pieces of polymeric mesh filters were inserted in both ends, following by filling each arm with ~500 mg of Dowex Monosphere 550A LC NG strong anion exchange resin in the hydroxide ion form, and the peripheral ends were furnished with polymeric mesh filters to keep the ion exchange resin in place. The three devices were thereafter placed in separate E-flasks, each containing 100 ml of a prepared solution containing 1 liter of water, ~10 mg of bromophenol blue as pH indicator, 1 g sodium chloride, and 0.08 ml of 37% (w/w) hydrochloric acid. Two of the devices were rotated magnetically at 300 rpm (Experiments 1.1 and 1.2) whereas the third was left unrotated. (Experiment 1.3). The device used in Experiment 1.2 had its inlet holes blocked by tape, so no liquid could enter or leave there. The inlet holes were left unobstructed in Experiments 1.1 and 1.3. The efficiency of the mass transfer between the solution and the ion exchanger resin inside the devices liquid was estimated by the time until the indicator visibly turned blue. The outcome of the experiment is accounted for in Table 1.

TABLE 1

Mass transfer efficiency enhancement by rotating a tubular reactor device.

| Experiment | Rotation (rpm) | Central Hole | Time until color change (s) |
|---|---|---|---|
| 1.1 | 300 | Open | 20 |
| 1.2 | 300 | Sealed | 300 |
| 1.3 | Unagitated | Open | 900 |

In the present set-up, the simple neutralization of hydrochloric acid by hydroxide ions bound as counter-ions to an anion exchanger serves as an example reaction. The requirements for the reaction to take place are either that the hydronium ions that are part of the acidic test medium are transported to the ion exchanger within the device, where they react with the hydroxide ions that are attached as counter-ions; or that chloride ions from the sodium chloride added in the solution are transported to the solid reagent contained within the device where they are exchanged for hydroxide ions attached to the ion exchanger as counter-ions. These must in turn be transported back to the solution to react with the hydronium ion excess in the acidic bulk medium. Common to both these reactions is that they require that the reactant be transported to the ion exchanger (the solid member) by means of the fluidic test medium, which in this case is based on water. This set-up hence serves as a simple but highly illustrative demonstration of the enhanced mass transfer that is established through the device by rotation, and unequivocally shows that rotation of the device resulted in a mass transfer that was at least 45 times more efficient compared to an unstirred identical device in the same reaction vessel. Experiment 1.3 further verifies that less than 7% of this mass transfer enhancement can be explained by turbulent convective transport through the meshes located at the peripheral exits. A mass transfer enhancement increase this significant shown by the rotated device with its central holes unobstructed can only be explained by the establishment of a fluidic flow through the device accomplished by the combination of its design and its rotation. It hence serves as a demonstrator of the general principle of establishing a transfer of fluid between the inside of the device (medium, solid, etc) and the fluidic medium in winch it is rotated.

Example 2

A device prepared essentially according to the device described in FIG. 9 was filled with 0.75 g ion exchanger, Dowex Monosphere A550 LCNG OH and immersed in a solution of 3 mL hydrochloric acid (0.16 M) with dissolved phenolphthalein, 0.33 g NaCl, diluted up to 250 mL with MilliQ water. A 12 VDC wiper motor was connected and an oscillation motion was performed at 55 sweep/min. The reaction was completed after 16 minutes as indicated by the change of color of the indicator.

As a control experiment the device was used under the same conditions but without applying the oscillating motion where no reaction occurred for more than 1 hour.

What is claimed is:

1. A device for performing a biological/chemical transformation or a physical/chemical trapping in fluidic media, the device comprising:

a flow distributor having at least one centrally located fluid inlet, a plurality of peripherally located fluid outlets, and at least one confinement therein where the biological/chemical transformation or the physical/chemical trapping is performed, the flow distributor configured such that a fluid flows into the at least one centrally located fluid inlet and through the at least one confinement before exiting through the plurality of peripherally located fluid outlets, the flow distributor being puck-shaped such that a height of the flow distributor is smaller than a diameter of the flow distributor, the flow distributor being circular in cross-section according to a plane perpendicular to a central axis of the flow distributor, and the flow distributor configured to house one or more solid reaction members that interact with at least one agent in the fluid to undergo the biological/chemical transformation or physical/chemical trapping in the at least one confinement; and a rotating assembly configured to rotate the flow distributor, wherein the at least one confinement of the flow distributor is divided into a plurality of sectors, the plurality of sectors defined by radially arranged dividing elements, each of the plurality of sectors connected to the at least one centrally located fluid inlet and the plurality of peripherally located fluid outlets, and the at least one confinement is configured to hold one or more cartridges containing the one or more solid reaction members.

2. The device of claim 1, wherein the rotating assembly is configured for magnetic actuation, the rotating assembly including a magnet embedded in the flow distributor and a magnet rotator configured to rotate the magnet.

3. The device of claim 1, wherein the rotating assembly includes a mechanical actuation shaft connected to the flow distributor and an external actuator configured to rotate the mechanical actuation shaft.

4. The device of claim 1, wherein the at least one confinement includes one or more cartridges containing the one or more solid reaction members.

5. A method for performing a biological/chemical transformation or physical/chemical trapping in fluidic media, the method comprising:
introducing a fluid into the device of claim 1.

6. A flow distributor comprising:
at least one centrally located fluid inlet;
a plurality of peripherally located fluid outlets; and
at least one confinement therein where a biological/chemical transformation or a physical/chemical trapping in fluidic media is performed, the at least one confinement divided into a plurality of sectors, the plurality of sectors defined by radially arranged dividing elements, each of the plurality of sectors connected to the at least one centrally located fluid inlet and the plurality of peripherally located fluid outlets, wherein the flow distributor is configured such that a fluid flows into the at least one centrally located fluid inlet and through the at least one confinement before exiting through the plurality of peripherally located fluid outlets, the flow distributor being puck-shaped such that a height of the flow distributor is smaller than a diameter of the flow distributor, the flow distributor being circular in cross-section according to a plane perpendicular to a central axis of the flow distributor, the flow distributor configured to house one or more solid reaction members that interact with at least one agent in the fluid to undergo the biological/chemical transformation or physical/chemical trapping in the at least one confinement, and the at least one confinement is configured to hold one or more cartridges containing the one or more solid reaction members.

* * * * *